(12) United States Patent
Poudrier

(10) Patent No.: US 11,654,947 B1
(45) Date of Patent: *May 23, 2023

(54) VERSATILE ARTICLE SUPPORT DEVICE

(71) Applicant: Alan S Poudrier, Niceville, FL (US)

(72) Inventor: Alan S Poudrier, Niceville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,442

(22) Filed: Aug. 22, 2021

Related U.S. Application Data

(63) Continuation-in-part of application No. 16/537,593, filed on Aug. 11, 2019, now Pat. No. 11,097,759, which is a continuation-in-part of application No. 16/125,672, filed on Sep. 8, 2018, now Pat. No. 10,376,045, which is a continuation-in-part of application No. 15/962,262, filed on Apr. 25, 2018, now abandoned.

(51) Int. Cl.
- *B62B 3/02* (2006.01)
- *B62B 5/00* (2006.01)
- *B62B 3/10* (2006.01)
- *B62B 3/04* (2006.01)
- *B25H 1/00* (2006.01)

(52) U.S. Cl.
CPC ............. *B62B 3/02* (2013.01); *B62B 3/022* (2013.01); *B62B 3/04* (2013.01); *B62B 3/108* (2013.01); *B62B 5/0083* (2013.01); *B25H 1/0007* (2013.01)

(58) Field of Classification Search
CPC .. B62B 3/108; B62B 3/02; B62B 3/04; B62B 5/0083; B62B 3/022; B62B 3/008; B62B 3/10; B25H 1/0007
See application file for complete search history.

(56) References Cited

U.S. PATENT DOCUMENTS

| | | | | |
|---|---|---|---|---|
| 5,040,809 | A * | 8/1991 | Yang | B62B 3/02 |
| | | | | 280/42 |
| 6,811,038 | B1 * | 11/2004 | Sanderson | A47B 81/00 |
| | | | | 211/13.1 |
| 7,237,758 | B2 * | 7/2007 | Nikolic | B25H 1/0007 |
| | | | | 248/676 |
| 7,377,502 | B2 * | 5/2008 | Nikolic | B25H 1/0007 |
| | | | | 269/55 |
| 9,623,889 | B2 * | 4/2017 | Wallace-Riley | B62B 3/022 |
| 10,376,045 | B1 * | 8/2019 | Poudrier | B62B 3/002 |
| 10,471,980 | B1 * | 11/2019 | Jordan | B65G 57/03 |
| 10,981,588 | B1 * | 4/2021 | Poudrier | B62B 3/02 |
| 11,097,759 | B1 * | 8/2021 | Poudrier | B62B 3/008 |
| 11,172,761 | B2 * | 11/2021 | Van Zile, Jr. | A47B 43/00 |
| 2006/0113435 | A1 * | 6/2006 | Nikolic | B25H 1/0007 |
| | | | | 248/122.1 |
| 2014/0217045 | A1 * | 8/2014 | Nesin | B65D 85/68 |
| | | | | 211/13.1 |

(Continued)

*Primary Examiner* — Kimberley S Wright
(74) *Attorney, Agent, or Firm* — Peter Loffler

(57) ABSTRACT

A versatile transport rack uses a center frame and one or two outer frames that are pivotally attached to the center frame on opposing sides thereof. Hinge pin receiver pairs, having vertically aligned openings, are attached to each of one or two vertical rails extending upwardly from the center frame and receive door pin pairs of a vehicle door. Landing implements, such as castors or landing gear, are removably attached to the center frame, the outer frames or both. A deck plate can be attached to one or both of the outer frames.

22 Claims, 7 Drawing Sheets

(56) References Cited

U.S. PATENT DOCUMENTS

| | | | |
|---|---|---|---|
| 2015/0118006 A1* | 4/2015 | Wallace-Riley | B62B 3/004 |
| | | | 414/800 |
| 2019/0331291 A1* | 10/2019 | Poudrier | F16M 11/38 |
| 2021/0274932 A1* | 9/2021 | Van Zile, Jr. | A47B 43/00 |

* cited by examiner

VERSATILE ARTICLE SUPPORT DEVICE

This application is a Continuation-In-Part of U.S. patent application Ser. No. 16/537,593, filed on Aug. 11, 2019, which is a Continuation-In-Part of U.S. patent application Ser. No. 16/125,672, filed on Sep. 8, 2018, now U.S. Pat. No. 10,376,045 issued on Aug. 13, 2019, which is a Continuation-In-Part of U.S. patent application Ser. No. 15/962,262, filed on Apr. 25, 2018, now abandoned, each of which is incorporated by reference herein in its entirety.

BACKGROUND OF THE INVENTION

1. Field of the Invention

The present invention relates to a ground supported rack that rests on the ground surface or rolls on, castors, the rack having a one or two sections of a horizontal base and an upwardly projecting vertical support so that the rack can hold various items supported by either its horizontal base or the vertical support, or both, the vertical support having receivers that receive door pins of vehicle doors.

2. Background of the Prior Art

Many people who enjoy outdoor activities own sport utility vehicles (SUVs) with doors that can be removed in order to give occupants more outdoor pleasure while riding in the vehicle. The doors, once removed, need to be stored in appropriate fashion in order to prevent damage to them, particularly paint damage. As such doors are relatively bulky and heavy, such storage is not an easy task. Laying the doors on a ground surface is not satisfactory as that can cause damage to the door, especially to its finish. Therefore, some devices are available for storing the doors, but such devices do not offer any purpose beyond this singular purpose of temporary door storage and are not otherwise of particular utility when not serving in their intended purpose and are they themselves relatively large and bulky.

What is needed is a device that is designed to easily and effectively hold one or more vehicle doors that are removed from a vehicle so as to prevent the doors from becoming damaged when stored off of the vehicle. Such a device must be able to easily move about the ground level when the doors are being held by the device. Such a device must have substantial utility beyond the task of holding and moving vehicle doors about so that the device is multipurpose in its functioning. Such a device must provide support for a variety of articles as defined by the user's needs and also be relatively small and compact when not in use for ease of storage or transport of the device.

SUMMARY OF THE INVENTION

The versatile article support device of the present invention addresses the aforementioned needs in the device by providing an article rack that is specifically configured to hold vehicles doors that are removed from a vehicle and easily move the doors about a ground surface as needed. The versatile article support device allows for quick and easy donning of the doors onto the device and doffing therefrom without the need for any specialized tools or other implements. The versatile article support device has substantial versatility beyond its door storing and transport function and can be quickly configured for a wide variety of diverse storage and transport tasks. The versatile article support device is of relatively simple design and construction, being produced using standard manufacturing techniques, so that the device is relatively inexpensive to produce so as to be economically attractive to potential consumers for this type of device. Use and maintenance of the versatile article support device is simple and straightforward. The versatile article support device is lightweight and compact in design and is collapsible for ease of storage and transport of the device.

The versatile article support device of the present invention is comprised of a center frame that has a first upper surface facing upwardly and an opposing first lower surface. The center frame also has pair of coextensive horizontally disposed center rails and a pair of vertical rails, each vertical rail extending upwardly from a respective one center rail and being oriented in generally normal fashion with respect to the center rails. A first outer frame has a pair of coextensive outer rails. The first outer frame has a second upper surface and a second lower surface. Each outer rail is attached to a respective one center rail of the center frame and is capable of pivoting with respect to the center rail allowing the outer frame to rotate between a first unfolded position wherein the outer rails and the center rails are aligned on a pair of parallel longitudinal axes and a first folded position wherein the outer rails abut (although not necessarily touch) the vertical rails. A first of hinge pin receiver has a first vertically disposed opening and is attached to one of the vertical rails while a second of hinge pin receiver has a second opening and is attached to the same vertical rail to which the first hinge pin receiver is attached and below the first hinge pin receiver. The first opening of the first hinge pin receiver and the second opening of the second hinge pin receiver align with one another so that a first axis passes longitudinally through the aligned first opening and the second opening. The first axis is also substantially parallel with the vertical rail to which the first hinge pin receiver and the second hinge pin receiver are attached. The first hinge pin receiver has a third opening and the second hinge pin receiver has a fourth opening such that the third opening of the first hinge pin receiver and the fourth opening of the second hinge pin receiver align with one another so that a second axis passes longitudinally through the aligned third opening and the fourth opening, the second axis also parallel with the first axis. A third of hinge pin receiver has a fifth vertically disposed opening and is attached to the other vertical rail (the vertical rail that does not have the first hinge pin receiver and second hinge pin receiver attached thereto). A fourth of hinge pin receiver having a sixth opening, the fourth hinge pin receiver attached to the same vertical rail to which the third hinge pin receiver is attached and below the third hinge pin receiver, such that the fifth opening of the third hinge pin receiver and the sixth opening of the fourth hinge pin receiver align with one another so that a third axis passes longitudinally through the aligned fifth opening and the sixth opening, the third axis also parallel with the vertical rail to which the third hinge pin and the fourth hinge pin receiver are attached. The third hinge pin receiver has a seventh opening and the fourth hinge pin receiver has an eighth opening such that such that the seventh opening of the third hinge pin receiver and the eighth opening of the fourth hinge pin receiver align with one another so that a fourth axis passes longitudinally through the aligned seventh opening and the eighth opening, the fourth axis also parallel with the third axi. A first landing implement is attached to the first lower surface of the center frame which may be a first castor attached to one of the center rails and a second castor attached to the other center rail. A second landing implement is attached to the second lower surface of the first outer frame and may be a third castor attached to one of first outer rails and a fourth castor attached to the other outer rail. A deck plate is attached to the second upper surface of the first outer frame. The first outer frame is lockable in the first folded position and is also lockable in the first unfolded position. At least one bumper is attached to the second upper surface of the outer frame either directly thereto or with a deck plate sandwiched between the two. A second outer frame is attached to the center frame on an opposing side relative to the side of the center frame to which the first outer frame is attached. This second outer frame is substantially similar is design and function relative to the first outer frame.

BRIEF DESCRIPTION OF THE DRAWINGS

Similar reference numerals refer to similar parts throughout the several views of the drawings.

DESCRIPTION OF THE PREFERRED EMBODIMENT

Figure 1:
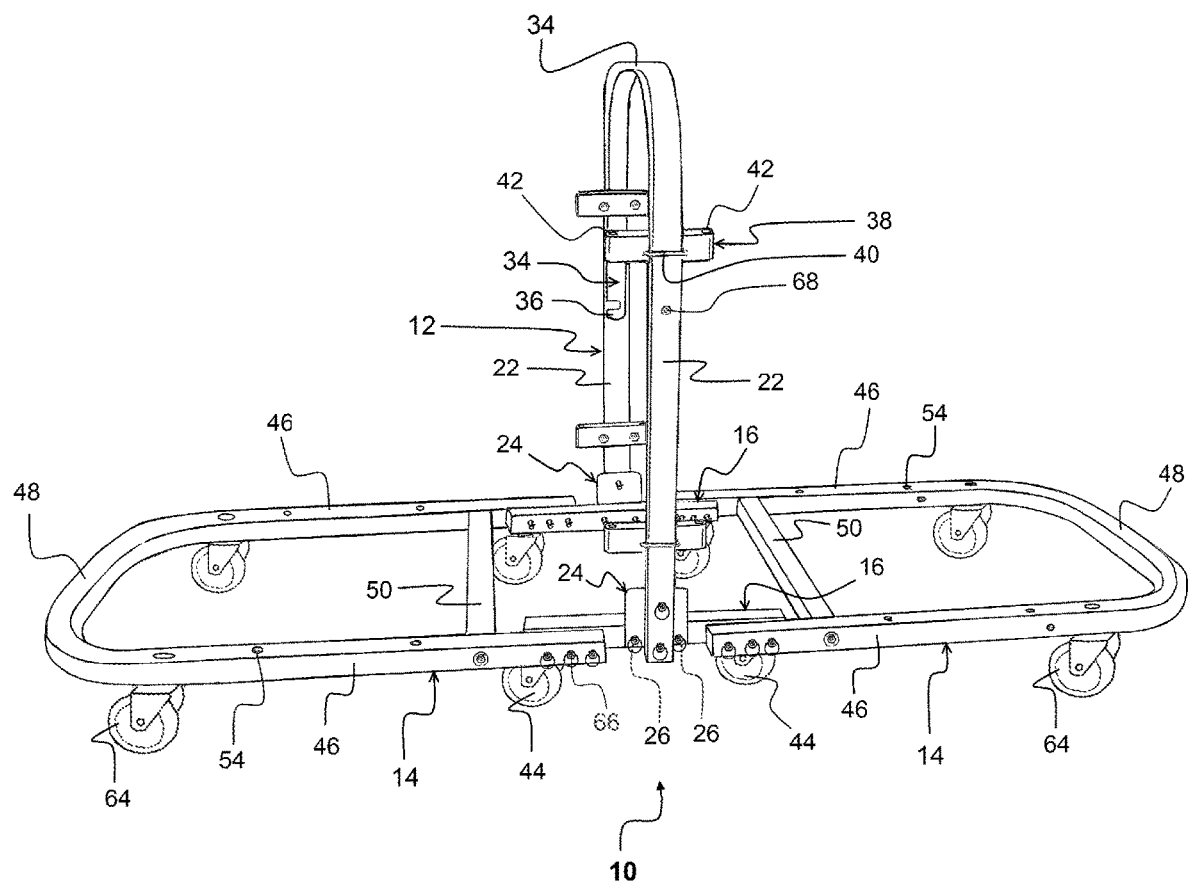
FIG. 1 is a perspective view of the versatile article support device of the present invention.
Figure 2:
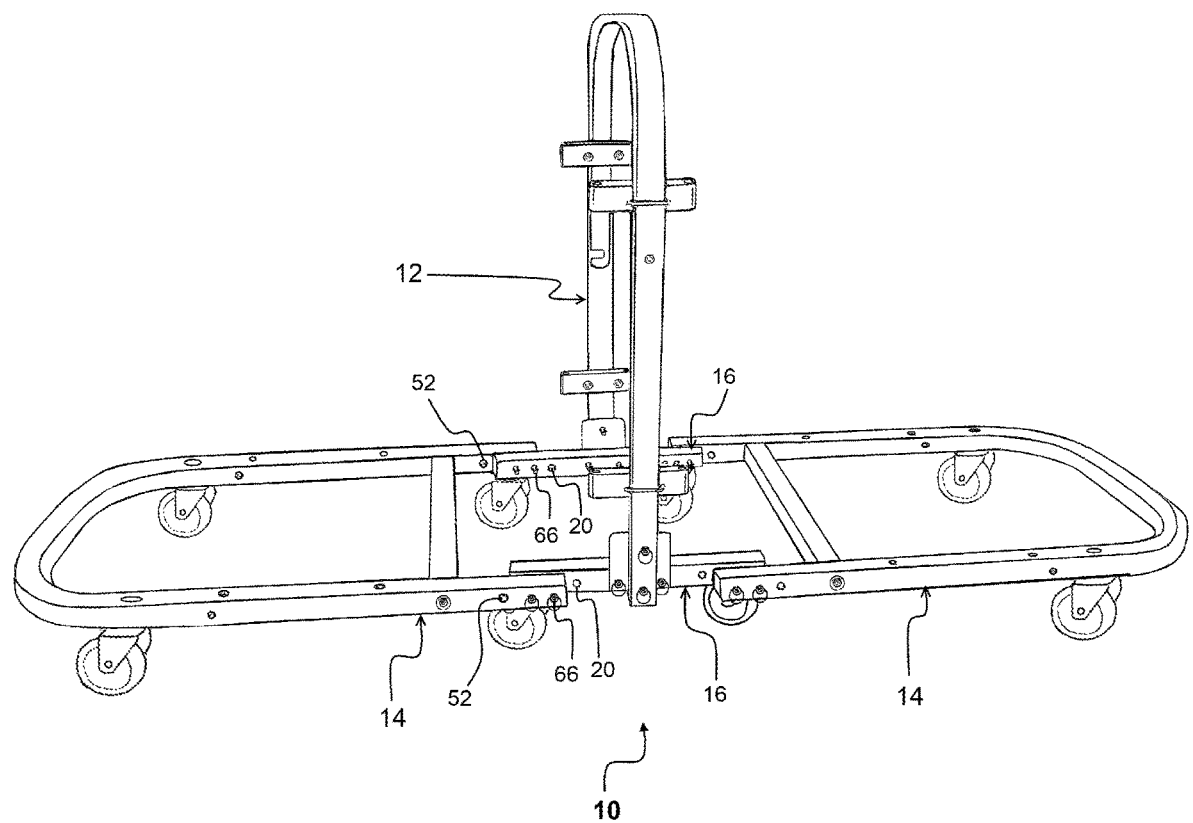
FIG. 2 is a perspective view of the versatile article support device having a different length configuration relative to the configuration in FIG. 1.
Figure 3:
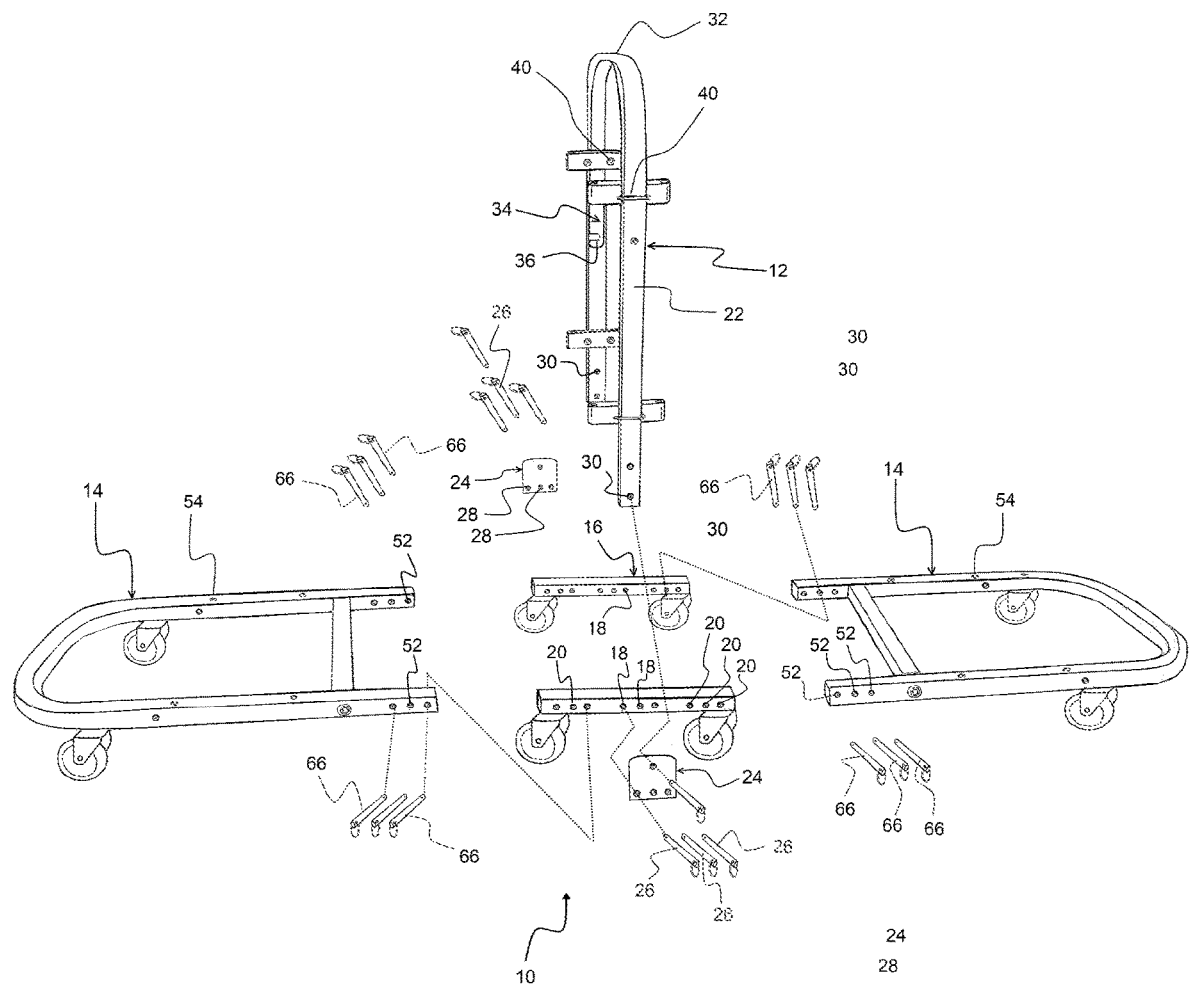
FIG. 3 is a partially exploded perspective view of the versatile article support device.
Figure 4:
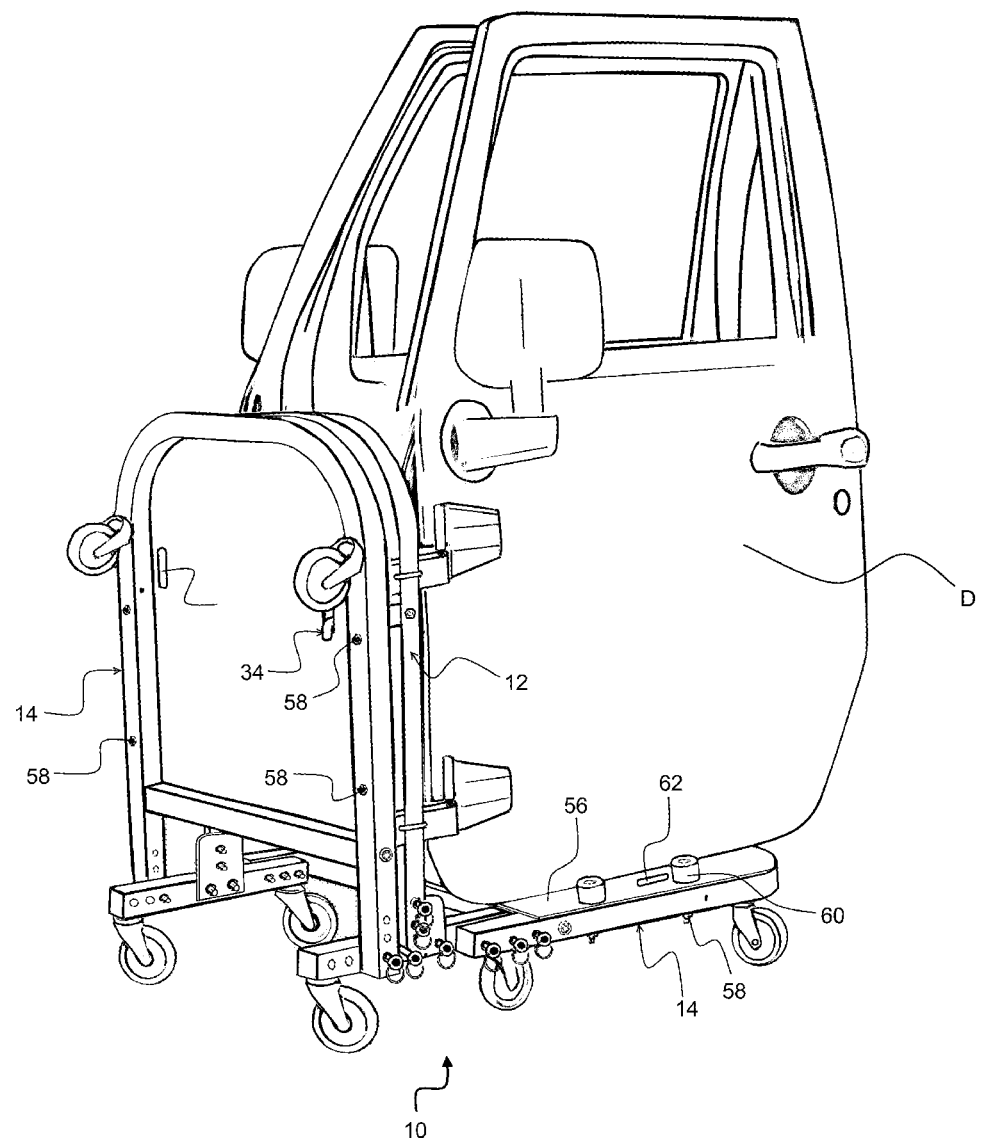
FIG. 4 is an environmental view of the versatile article support device holding a pair of vehicle doors.
Figure 5:
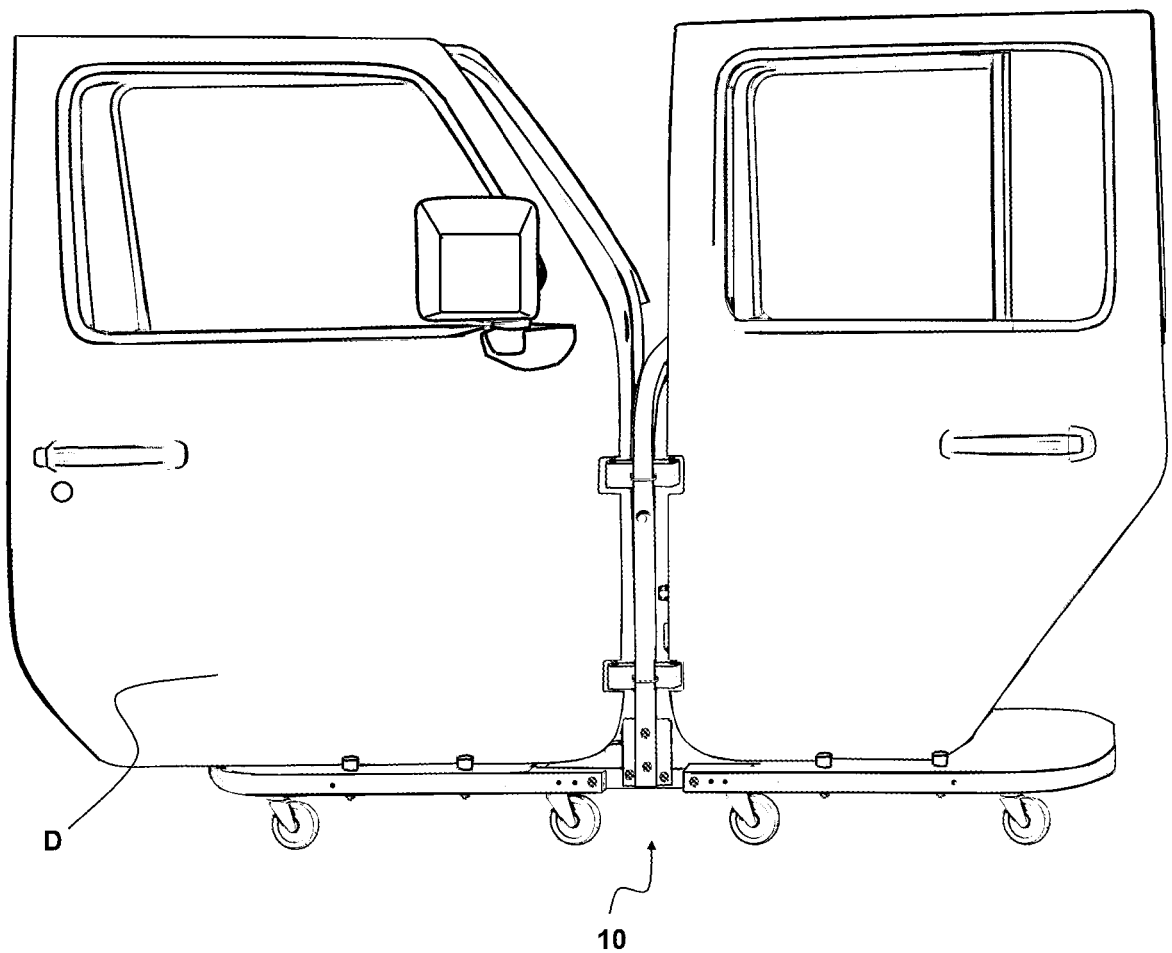
FIG. 5 is an environmental view of the versatile article support device holding two pairs of vehicle doors.
Figure 6:
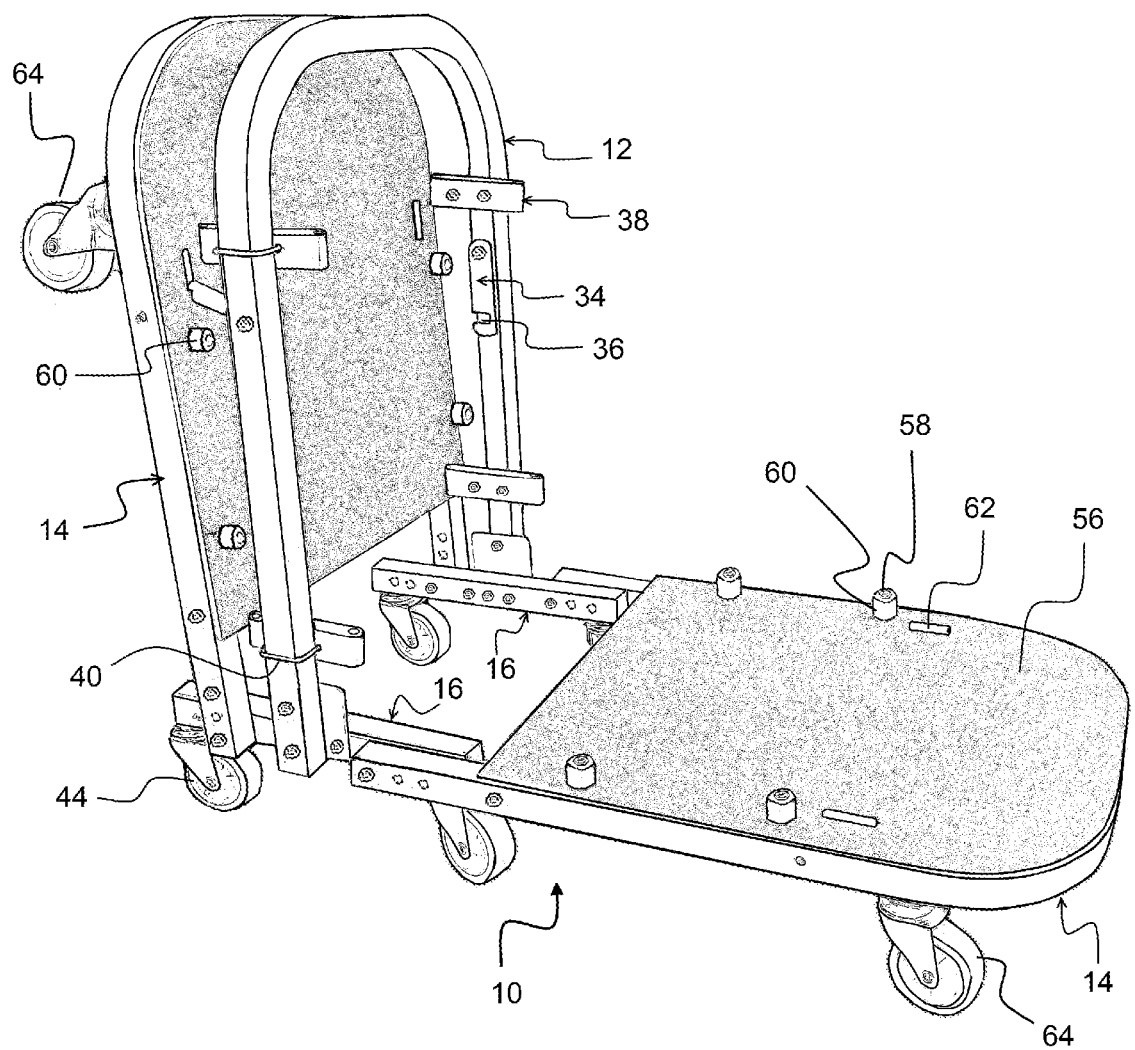
FIG. 6 is a perspective view of the versatile article support device in a partially folded configuration and utilizing optional deck plates.
Figure 7:
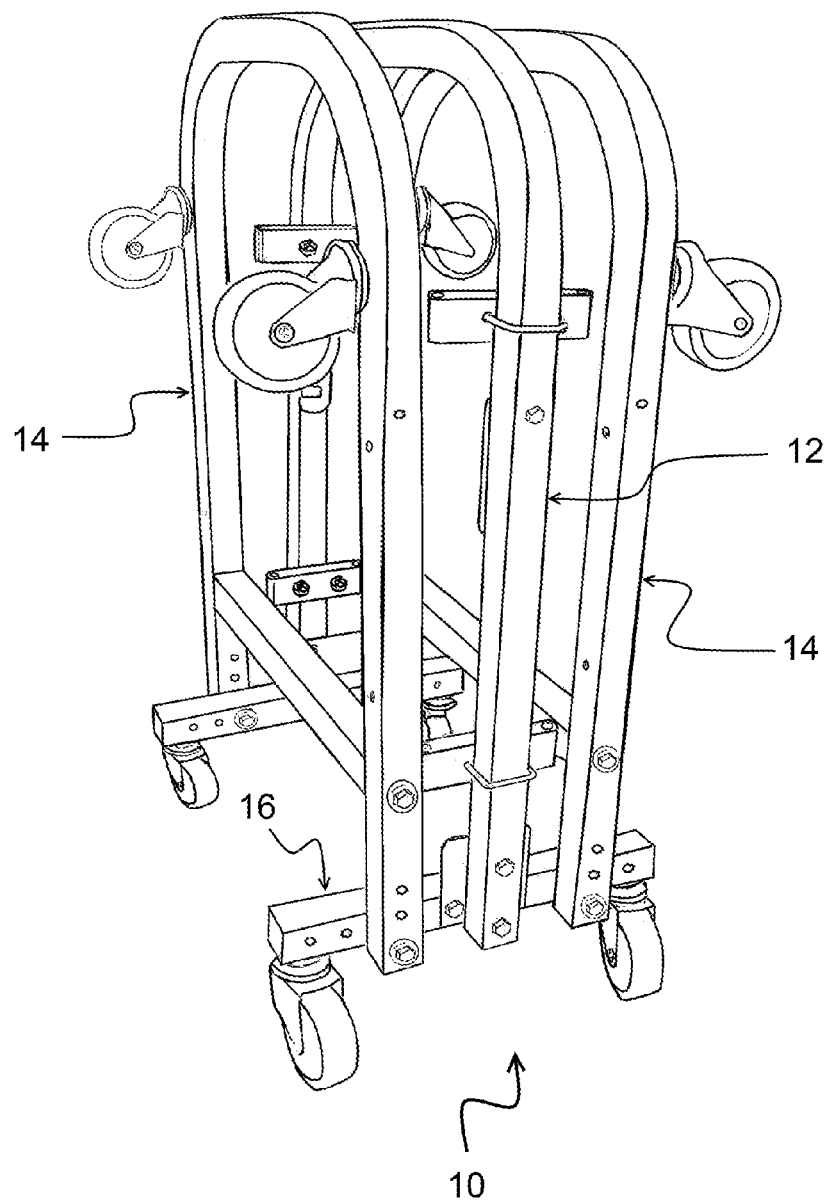
FIG. 7 is a perspective view of the versatile article support device in a folded configuration.

Referring now to the drawings, it is seen that the versatile article support device of the present invention, generally denoted by reference numeral 10, is comprised of a center frame 12 and one or two horizontally disposed outer frames 14, each outer frame 14 pivotally attached to the center frame 12 on opposing sides thereof.

The center frame 12 is comprised of a coextensive pair of center rails 16 such that each center rail 16 has a set of horizontally disposed center openings 18 and a set of horizontally disposed outer openings 20, one set each on opposing sides of the center openings 18 (if only one outer frame 14 is utilized, one set of outer openings 20 can be dispensed with). A pair of vertically disposed vertical rails 22 are attached to the center rails 16, one vertical rail 22 attached to each center rail 16. Attachment of each vertical rail 22 to its respective center rail 16 is via an appropriate bracket 24 such that appropriate pins 26 or bolts are passed through the center openings 18 and corresponding openings 28 on the bracket 24 and through openings 30 on the vertical rail 22—as seen the uppermost pin 26 or bolt is only passed through the opening 28 on the bracket and corresponding opening 30 on the vertical rail 22. The two vertical rails 22 are connected to one another by a top rail 32 in appropriate fashion or the two vertical rails 22 and the top rail 32 can be formed as a continuous member bent or otherwise configured into the desired shape and dimensions. A latch 34, having a hook 36 on its outer end, is attached to each vertical rail 22 in appropriate fashion so that the latch 34 is free to rotate thereabout.

As seen, a pair of hinge pin receives 38 is attached to at least one or possibly both of the vertical rails in any appropriate fashion (such as via the illustrated U-bolt 40). As seen, each pair of hinge pin receivers 38 is a body member that has a vertically disposed pin opening 42 therethrough on one or both ends of the body member. When a pair of the hinge pin receivers 38 is attached to one of the vertical rails 22, the hinge pin receivers 38 align with one another and the pin openings 42 likewise align with one another and face in a vertical orientation when attached to the center rails 16 as discussed below. The aligned pin openings 42 receive a pair of door pins from a door D of a vehicle in order to hold the door D thereby. The hinge pin receivers 38 are height adjustable on the vertical rails 22 by simply loosening the U-bolts 40 or other attachment means, moving the hinge pin receiver 38 to it new position and thereafter retightening the U-bolt 40 or other attachment means.

A first set of castors 44 is attached to the underside of each of the center rails 16.

Each outer frame 14 is comprised of a pair of coextensive outer rails 46 that are joined at their respective distal ends by an outer cross rail 48 in appropriate fashion or the two outer rails 46 and the outer cross rail 48 can be formed as a continuous member bent or otherwise configured into the desired shape and dimensions. One or more inner cross rails 50 connect the two outer rails 46 and the inner cross rails 50 are attached to each outer rail in appropriate fashion. As seen, each outer rail 46 has a series of horizontally disposed openings 52 located on each outer rail's proximal end. Vertically disposed openings 54 can be provided on the outer frame 14 specifically on each outer rail 46 and possibly on the outer cross rail 48 and/or the inner cross rail(s) 50.

An optional deck plate 56 can be attached to the upper surface of each outer frame 14 by passing appropriate screws 58 through openings (not separately numbered) on the deck plate 56 that correspond with the vertically disposed openings 54 on outer frame 14. As seen, the screws 58 can also secure soft material (plastic, rubber, neoprene, etc.) bumpers 60 to an upper surface of the deck plate 56 by passing the screws through an appropriate opening on the bumper 60 before passing through the opening on the outer frame 14. The deck plate 56 has one or more slits 62 thereon A second set of castors 64 is attached to the underside of each of the outer frames 14. Either the first set of castors 44 and/or the second set of castors 64 can be attached to its respective frame 12 or 14 by an offset bracket (not illustrated) in order to align all the castors 44 and 64 on each side of the versatile article support device 10 on a single longitudinal axis.

The center frame 12 and the outer frames 14 are each made from an appropriate sturdy material such as aluminum or plastic.

In order to use the versatile article support device 10 of the present invention, each outer frame 14 is attached to the center frame by positioning each outer rail 46 of the outer frame 14 with a respective one center rail 16 of the center frame 12 so that the horizontally disposed openings 52 on the outer rail 46 align with the outer openings 20 on the center rail 16. Two or more pins 66 are passed through the aligned openings 52 and 20 such that one of the pins 66 (advantageously the innermost pin 66) acts as a pivot pin and the other pin(s) 66 act to secure the outer frame 14 in a substantially horizontal position when the device is on a ground surface—it is noted that only two sets of aligned openings 20 and 52 are needed with one pin 66 acting as the pivot pin and the other pin 66 holding the outer frame 14 in its unfolded position, however providing more than two outer openings 20 on the center rail 16 and/more than two openings 52 on the outer rails 46, allows a user to vary the overall length of the device when the outer frame 14 is in the unfolded position as best seen in FIGS. 1 an 2. After each outer frame 14 is so attached, the hinge pin receivers 38 are height adjusted so as to be able to receive the door pins of the vehicle doors therein. Additional items can be placed on the deck plate 56 or otherwise attached to the device as appropriate. The versatile article support device 10, once loaded can be wheeled as desired via the castors 44 and 64. If a deck plate 56 is provided, the bumpers 60 help prevent the door D from swinging outwardly without scratching the door D. The bumpers 60 can be attached directly to the outer frame 14.

If desired, one of the outer frames 14, if its use is not needed, or both of the outer frames, 14 if the versatile article support device 10 is to be stored or transported unloaded, can be folded into abutting relationship with the vertical rails 22. In order to accomplish this, all but one of the pins 66 that connect the outer frame 14 to the center frame 12 on each side of the device are removed, allowing the outer frame 14 to pivot about the remaining pin 66 on each side of the device. The outer frame 14 is rotated from its unfold horizontal position to its folded position abutting the vertical rails 22 of the center frame 12. If the deck plate 56 is being used, the latch 34 is passed through the slit 62 on the deck plate 56 such that the hook 36 of the latch 34 engages the deck plate 56 and locks the outer frame 14 in its folded position. Each vertical rail has a securement pin 68 so that the latch 34 can engage the securement pin 68 in order to lock the outer frame 14 in its folded position if a deck plate 56 is not present on the outer frame 14. Of course, other means of locking the outer frame 14 in its folded position can be used such as magnets, straps, etc.

It is expressly recognized that either the first set of castors 44 or the second set of castors 64, or both sets can be eliminated so that the device rests on a surface via its frames 12 and 14. Additionally, in lieu of the first set of castors 44 or the second set of castors 64, landing gear (not illustrated—similar to landing gear of a trailer of a tractor-trailer set or a kickstand) can be used, which landing gear may be fixed, possibly telescoping, or can be folded and unfolded as needed.

While the invention has been particularly shown and described with reference to an embodiment thereof, it will be appreciated by those skilled in the art that various changes in form and detail may be made without departing from the spirit and scope of the invention.

I claim:

1. A rack comprising:
   a center frame having having a pair of coextensive horizontally disposed center rails each having a first upper surface and an opposing first lower surface, the center frame also having a pair of vertical rails, each vertical rail extending upwardly from a respective one center rail;
   a first outer frame having a pair of coextensive first outer rails and having a second upper surface and an opposing second lower surface, such that each first outer rail is attached to a respective one center rail via a pair of first pins that each pass through a respective one of the first outer rail and through a respective one center rail with the first outer frame pivoting with respect to the center frame about the pair of first pins such that the first outer frame is capable of rotating between a first unfolded position wherein the first outer rails and the center rails are aligned on first parallel longitudinal axes and a first folded position wherein the first outer rails each abut one of the vertical rails and such that the first outer frame is locked into the first unfolded position via a pair of second pins that each pass through a respective one of the first outer rail and through a respective one center rail;
   a first of hinge pin receiver having a first vertically disposed opening, the first hinge pine receiver attached to one of the vertical rails; and
   a second of hinge pin receiver having a second opening, the second hinge pin receiver attached to the same vertical rail to which the first hinge pin receiver is attached and below the first hinge pin receiver, such that the first opening of the first hinge pin receiver and the second opening of the second hinge pin receiver align with one another so that a first axis passes longitudinally through the aligned first opening and the second opening, the first axis also parallel with the vertical rail to which the first hinge pin and the second hinge pin receiver are attached.

2. The rack as in claim 1 wherein the first hinge pin receiver has a third opening and the second hinge pin receiver has a fourth opening such that such that the third opening of the first hinge pin receiver and the fourth opening of the second hinge pin receiver align with one another so that a second axis passes longitudinally through the aligned third opening and the fourth opening, the second axis also parallel with the first axis.

3. The rack as in claim 1 further comprising:
   a third of hinge pin receiver having a third vertically disposed opening, the third hinge pin receiver attached to the vertical rail that does not have the first hinge pin receiver attached thereto; and
   a fourth of hinge pin receiver having a fourth opening, the fourth hinge pin receiver attached to the same vertical rail to which the third hinge pin receiver is attached and below the third hinge pin receiver, such that the third opening of the third hinge pin receiver and the fourth opening of the fourth hinge pin receiver align with one another so that a second axis passes longitudinally through the aligned third opening and the fourth opening, the second axis also parallel with the vertical rail to which the third hinge pin and the fourth hinge pin receiver are attached.

4. The rack as in claim 3 wherein the first hinge pin receiver has a fifth opening and the second hinge pin receiver has a sixth opening such that such that the fifth opening of the first hinge pin receiver and the sixth opening of the second hinge pin receiver align with one another so that a third axis passes longitudinally through the aligned fifth opening and the sixth opening, the third axis also parallel with the first axis and the third hinge pin receiver has a seventh opening and the fourth hinge pin receiver has an eighth opening such that such that the seventh opening of the third hinge pin receiver and the eighth opening of the fourth hinge pin receiver align with one another so that a fourth axis passes longitudinally through the aligned seventh opening and the eighth opening, the fourth axis also parallel with the second axis.

5. The rack as in claim 1 further comprising a first landing implement attached to the first lower surface of the center frame.

6. The rack as in claim 5 wherein the first landing implement is a first castor attached to one of the center rails and a second castor attached to the other center rail.

7. The rack as in claim 1 further comprising a first landing implement attached to the second lower surface of the first outer frame.

8. The rack as in claim 7 wherein the second landing implement is a first castor attached to one of the first outer rails and a second castor attached to the other first outer rail.

9. The rack as in claim 1 further comprising a deck plate attached to the second upper surface of the first outer frame.

10. The rack in claim 1 wherein the first outer frame is lockable in the first folded position.

11. The rack in claim 1 wherein the first outer frame is lockable in the first unfolded position.

12. The rack as in claim 1 further comprising a bumper attached to the second upper surface of the first outer frame.

13. The rack as in claim 1 further comprising a second outer frame having a pair of coextensive second outer rails and having a third upper surface and an opposing third lower surface, such that each second outer rail is attached to a respective one center rail on an opposing side of the center rail with respect to the attachment side of the first outer frame, the second outer frame pivoting with respect to the center frame such that the second outer frame is capable of rotating between a second unfolded position wherein the second outer rails and the center rails are aligned on second parallel longitudinal axes and a folded position wherein the second outer rails each abut one of the vertical rails.

14. The rack as in claim 13 further comprising a first landing implement attached to the first lower surface of the center frame.

15. The rack as in claim 14 wherein the first landing implement is a first castor attached to one of the center rails and a second castor attached to the other center rail.

16. The rack as in claim 13 further comprising:
    a first landing implement attached to the second lower surface of the first outer frame; and
    a second landing implement attached to the third lower surface of the second outer frame.

17. The rack as in claim 16 wherein the first landing implement is a first castor attached to one of the first outer rails and a second castor attached to the other first outer rail and the second landing implement is a third castor attached to one of the second outer rails and a fourth castor attached to the other second outer rail.

18. The rack as in claim 13 further comprising a first deck plate attached to the second upper surface of the first outer frame.

19. The rack as in claim 18 further comprising a second deck plate attached to the third upper surface of the second outer frame.

20. The rack in claim 13 wherein the first outer frame is lockable in the first folded position.

21. The rack in claim 13 wherein the first outer frame is lockable in the first unfolded position.

22. The rack as in claim 13 further comprising a bumper attached to the second upper surface of the first outer frame.

\* \* \* \* \*